United States Patent [19]

Corey

[11] 4,184,517
[45] Jan. 22, 1980

[54] LOCKED LINED PIPE AND METHOD FOR MAKING SAME

[75] Inventor: Kenneth J. Corey, Fullerton, Calif.
[73] Assignee: Donald J. Lewis, Irvin, Calif.
[21] Appl. No.: 912,377
[22] Filed: Jun. 5, 1978
[51] Int. Cl.² .............................................. F16L 9/14
[52] U.S. Cl. ................................ 138/147; 264/249; 264/262; 264/320
[58] Field of Search ............... 138/147, 143, 146, 112, 138/114; 264/262, 320, 249; 29/458

[56] References Cited

U.S. PATENT DOCUMENTS

| 2,982,360 | 5/1961 | Morton et al. | 138/147 |
| 3,084,003 | 4/1963 | Matt et al. | 138/147 |
| 3,686,375 | 8/1972 | Hall | 264/262 |

Primary Examiner—Lenard A. Footland
Attorney, Agent, or Firm—Koda and Androlia

[57] ABSTRACT

A lined pipe including an outer pipe, an inner pipe provided within the outer pipe and extending substantially in the entire length of the outer pipe and the plurality of locking shims provided between the inner surface of the outer pipe and the outer surface of the inner lining pipe formed by injecting a resin into any voids between the inner surface of the outer pipe and the outer surface of the inner lining pipe, letting the resin cure and jarring the lined pipe to break the cured resin into small pieces which wedge between the outer surface of the inner lined pipe and the inner surface of the outer lined pipe whereby the inner lining is locked to the outer pipe.

8 Claims, 4 Drawing Figures

LOCKED LINED PIPE AND METHOD FOR MAKING SAME

BACKGROUND OF THE INVENTION

1. Field of the Invention

This invention relates to lined pipe and more particularly to lined pipe wherein the lining is coupled to the outer pipe.

2. Prior Art

In the prior art there exists many methods for making lined pipe wherein the lining is coupled to the outer pipe and each of such methods has its own disadvantages and drawbacks. The most simplist method is to make the outer diameter of the lining approximately the same as the inside diameter of the outer pipe and then press the lining into the outer pipe. This method has certain disadvantages in that the lining may crack during the pressing process if the lining is made from a rigid material, the lining may eventually work free of the outer pipe since there is no real coupling between the lining and the outer pipe except friction and expensive machinery is required to press the lining into the outer pipe.

Another method for coupling the lining to the outer pipe is to score the inner surface of the outer pipe, press the lining which has an outer diameter which is substantially equal to the inner diameter of the outer pipe into the outer pipe and then heat the outer pipe to cause the lining to flow into the scoring and form a coupling thereinbetween. This method has most of the disadvantages of the above described method except that it overcomes the disadvantage of the eventual working free of the lining from the outer pipe; but this method provides additional disadvantages in that it requires more equipment than the previously described method and can only be used with metallic outer pipes and linings which can be melted.

A third method for coupling the lining to the outer pipe is to inject a thermal-setting adhesive which can bond to both the lining and the outer pipe between the lining and the outer pipe to form an adhesive bond between the lining and the outer pipe. This method may overcome some of the disadvantages described above but it has a particular disadvantage in that it can be only used with adhesives which can bond to the materials of both the lining and the outer pipe.

A fourth method for coupling the lining to the outer pipe includes the steps of forming two sections of lining wherein each of the sections has one flanged end and the unflanged ends of the lining are formed so that one can fit into the other. These two sections of lining are then inserted into opposite ends of the outer pipe and bonded together. This method again overcomes some of the above described disadvantages but it too creates its own disadvantages. The major disadvantage of this method is that it requires specially formed sections of lining which may be expensive and time consuming to manufacture. Another problem is that if the pipe must be shortened at the point of installation, the coupling is destroyed by cutting off one of the flanged ends.

SUMMARY OF THE INVENTION

Accordingly, it is a general object of the present invention to provide a lined pipe wherein the lining is permanently coupled to the outer pipe.

It is still another object of the present invention to provide a method for making lined pipe wherein the lining is permanently coupled to the outer pipe.

It is still another object of the present invention to provide lined pipe in which the lining is coupled to the outer pipe which is simple and low in cost.

It is yet another object of the present invention to provide a method for coupling the lining to the outer pipe of a lined pipe which can be utilized with a variety of different materials for either the lining or the outer pipe.

In keeping with the principles and the objects of the present invention, the objects are accomplished by a unique lined pipe including an outer pipe, inner lining pipe provided within the outer pipe and extending substantially the entire length of the outer pipe and a plurality of locking shims provided between the inner surface of the outer pipe and the outer surface of the inner lining pipe. The shims are formed by injecting a resin into any voids between the inner surface of the outer pipe and the outer surface of the inner lining pipe, letting the resin cure and jarring the lined pipe to break the cured resin into small pieces which wedge between the outer surface of the inner lined pipe and the inner surface of the outer pipe whereby the inner lining pipe is locked and permanently coupled to the outer pipe.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
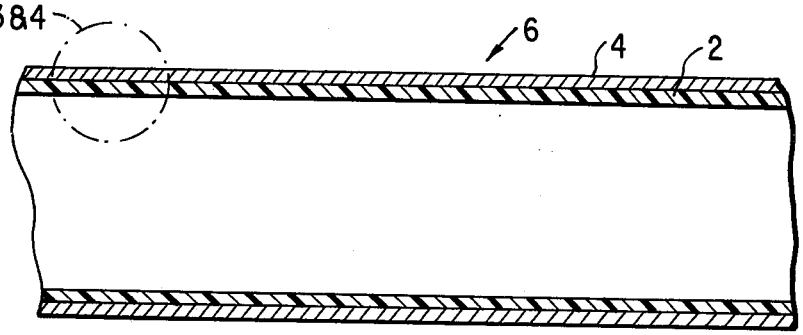
FIG. 1 is a cross sectional view of a lined pipe.

Referring more particularly to the figures, shown therein is a locked lined pipe and method for making same in accordance with the teachings of the present invention. As shown in FIG. 1 a lining 2 is inserted within an outer pipe 4 to form a lined pipe 6. In practice the outer pipe 4 is usually a metal pipe made from a metal such as a steel and the lining 2 is usually a plastic pipe made from a material such as polyvinyl chloride (PVC) or polypropolene (APL).

Figure 2:
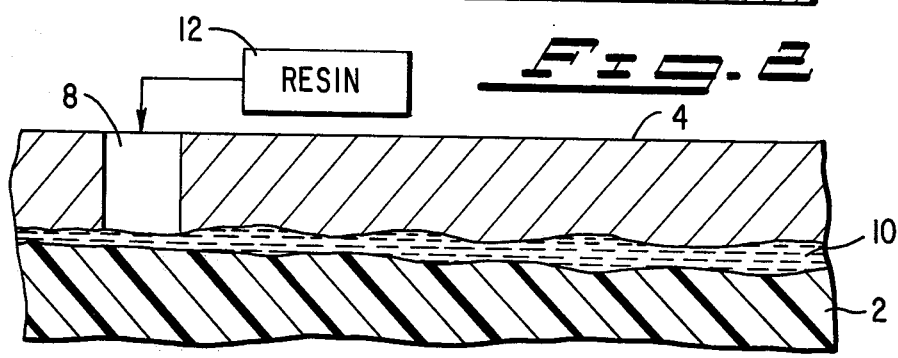
FIG. 2 is an enlarged sectional view of a portion of FIG. 1 illustrating a step in the process for making locked lined pipe in accordance with the teachings of the present invention.

As shown in FIG. 2, the inner surface of the outer pipe 4 and the outer surface of the lining 2 are not perfectly straight and there exists some voids thereinbetween. To manufacture the locked lined pipe in accordance with the teachings of the present invention, a hole 8 is drilled through the outer pipe 4. Then resin 10 from a resin source 12 is injected through the hole 8 and into the voids between the inner surface of the outer pipe 4 and the outer surface of the lining 2. It should be apparent that when making a long section of lined pipe that one might drill a plurality of holes 8 and inject resin 10 into the voids through the plurality of holes 8.

Figure 3:
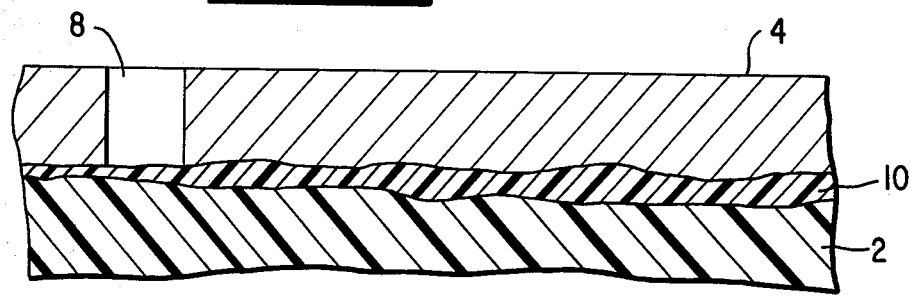
FIG. 3 is an enlarged sectional view of a portion of FIG. 1 illustrating another step in the process for making locked lined pipe in accordance with the teachings of the present invention.

As shown in FIG. 3, the resin 10 is cured to form a solid. Preferably a resin 10 is selected which does not form a bond to the material of the outer pipe 4 and the lining 2; but it would be possible to utilize a resin 10 which forms a bond to one but not both of the outer pipe 4 and the lining 2. In addition, it is preferable that the resin 10 be of the type that when it is cured the resin is brittle.

Figure 4:
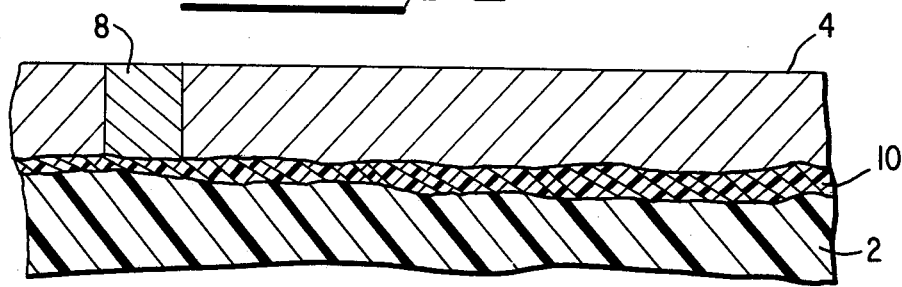
FIG. 4 is an enlarged cross sectional view of a portion of FIG. 1 illustrating a completed locked lined pipe in accordance with the teachings of the present invention.

In the final step after the resin has cured, the lined pipe is hit or jarred to cause the lining 2 to move relative to the outer pipe 4. When the lining 2 moves relative to the outer pipe 4, it causes the cured resin 10 to break up into small pieces which form shims or wedges which wedge between the outer pipe 4 and the lining 2 at various angles as shown in FIG. 4 to lock the lining 2 inside the outer pipe 4. To complete the lined pipe the hole 8 may be welded or braised closed as shown in FIG. 4; but for some applications this may not be required.

It should be apparent that the lining 2 may be inserted or pressed into the outer pipe 4, that the hole 8 may be drilled by and the resin 10 may be cured by any conventional method well known in the art. It should also be apprent that other materials such as adhesives could be substituted for the resin 10 so long as the material possesses those properties required of the resin 10.

It should be apparent to one skilled in the art that the above described embodiment is merely illustrative of but one of the many possible specific embodiments which represents. the application of the principles of the present invention. Numerous and varied other various arrangements can be readily devised by those skilled in the art without departing from the spirit and scope of the invention.

I claim:

1. A lined pipe comprising:
   an outer pipe;
   an inner lining pipe provided within the outer pipe and extending substantially the entire length of the outer pipe; and
   a plurarity of locking shims provided between the inner surface of the outer pipe and the outer surface of the inner lining pipe formed by injecting a resin into any voids between the inner service of the outer pipe and the outer surface of the inner lining pipe, letting the resin cure and jarring the line pipe to break the cured resin into small pieces which wedge between the outer surface of the inner lining pipe and the inner surface of the outer pipe whereby the inner lining pipe is locked to the outer pipe.

2. A lined pipe according to claim 1 wherein said resin is of the type which does not form a bond with the outer pipe or the inner lining pipe.

3. A lined pipe according to claim 2 wherein the outer pipe is metallic and the inner lining pipe is plastic.

4. A method for coupling an inner lining pipe to an outer pipe of a lined pipe comprising the steps of:
   injecting a material into any voids between the inner surface of the outer pipe and the outer surface of the inner lining pipe;
   curing a material; and
   jarring the lined pipe to break the cured material into small pieces which wedge between the outer surface of the inner lined pipe and the inner surface of the outer pipe whereby the inner lining pipe is locked to the outer pipe.

5. A method according to claim 4 wherein said material is resin.

6. A method according to claim 5 wherein said resin is of type which does not form a bond with the outer pipe or the inner lining pipe.

7. A method according to claim 6 wherein said step of injecting said material into any voids comprises drilling a hole in said outer pipe.

8. A method according to claim 7 wherein said outer pipe is metallic and said inner pipe is plastic.

* * * * *